United States Patent [19]

Douglas-Hamilton

[11] 4,313,739

[45] Feb. 2, 1982

[54] REMOVAL OF CONTAMINANTS FROM GASES

[75] Inventor: Diarmaid H. Douglas-Hamilton, Boston, Mass.

[73] Assignee: Avco Everett Research Laboratory, Inc., Everett, Mass.

[21] Appl. No.: 200,962

[22] Filed: Oct. 27, 1980

Related U.S. Application Data

[63] Continuation of Ser. No. 80,946, Oct. 1, 1979, abandoned.

[51] Int. Cl.³ .............................................. B03C 3/00
[52] U.S. Cl. .......................................... 55/2; 55/131; 55/154; 55/151
[58] Field of Search .................... 55/2, 131, 154, 151

[56] References Cited

U.S. PATENT DOCUMENTS

| | | | | |
|---|---|---|---|---|
| 1,931,436 | 10/1933 | Deutsch | ............................... | 55/131 |
| 3,154,682 | 10/1964 | Hartz et al. | ............................ | 55/131 |
| 3,443,570 | 5/1969 | King et al. | ................................ | 55/2 |
| 4,066,526 | 1/1978 | Yen | .......................................... | 55/2 |

FOREIGN PATENT DOCUMENTS 110774 10/1917 United Kingdom .................. 55/151

*Primary Examiner*—Bernard Nozick
*Attorney, Agent, or Firm*—M. E. Frederick; Gurdon R. Abell

[57] ABSTRACT

The parent gas to be purified is passed end-to-end through a porous electrically conductive cylinder or its equivalent having a small wire electrode disposed along its longitudinal axis. A voltage is applied between the cylinder and wire sufficient to produce a corona discharge and ionize gas in the vicinity of the wire. Substantially only contaminants having an ionization potential less than that of the parent gas are or remain ionized and due to the electric field producing the corona discharge, are simultaneously caused to move toward the cylinder. Similarly, only electronegative gases become negatively charged in a negative corona and are likewise removed. A slightly lower pressure is maintained outside the cylinder effective to capture and remove the contaminant that has migrated to or adjacent the inner surface of the cylinder along with a small amount of the parent gas. Purified gas exits from the outlet of the cylinder.

4 Claims, 3 Drawing Figures

REMOVAL OF CONTAMINANTS FROM GASES

This is a continuation of application Ser. No. 080,946 filed Oct. 1, 1979, now abandoned.

BACKGROUND OF THE INVENTION

In the past there have been a variety of gas purification and gas decontamination systems developed relying on quite widely different physical and chemical properties for their effective operation. One such method relies on the chemical properties either of the contaminants or the main gas stream constituent and operates by passing the gas through a liquid or over a bed of chemical salts where the contaminant to be removed reacts, because of its chemical nature, preferentially with the liquid or the salt and thereby becomes removed from the stream. A second method employs a physical absorber such as an activated charcoal bed which preferentially absorbs the contaminant gases. A third method employs first means to preferentially ionize the contaminant gas and second and separate means to apply a voltage across the gas to concentrate ions of the contaminant gas at an outlet. The gas in the vicinity of the outlet is pumped out and discarded. Still other methods involve the use of diffusion screens with passages preferentially depending on molecular sizes, temperature traps which remove gases having higher boiling points from those having lower boiling points, and electromagnetic separators which operate to segregate the gases on the basis of their molecular mass.

All of the above means have more or less effectiveness in removing contaminants from gases depending upon the particular amount of contaminant and the nature of the contaminant. If the preferred method in any instance is relatively inefficient, then several stages are cascaded until a proper purification level is reached. In this way an effective system may constitute a complex purification train, even though the particular technique, viewed as a one stage operation, is relatively straightforward. Several of the above techniques, notably the chemical absorption, the physical absorption, the diffusion screen and the temperature traps, present a high impedance to the main flow of gas; that is, the presence of the purification system greatly inhibits the flow of gas through the main stream and thereby causes some inefficiency in the overall application. A gas segregation system based upon electromagnetic separation on the basis of molecular mass generally does not present a high impedance to the main gas flow; however, in a rapid flow it calls for a large magnetic field and in the case of many contaminants, the molecular mass of the contaminants may be quite close to the molecular mass of the main gas flow constituents thereby rendering segregation by this method very difficult. Prior art gas segregation systems based on preferential ionization and the use of an electric field to effect separation require ionizing means separate from the provision of the electric field. Further, such prior art systems do not lend themselves to efficient removal of contaminant gases.

BRIEF DESCRIPTION OF THE INVENTION

Apparatus in accordance with the invention may comprise a porous electrically conductive cylinder inside a coaxial electrically nonconductive cylindrical vessel forming part of a sealed system. A metallic wire, for example, tungsten or tantalum, insulated from the porous inner cylinder is stretched along the axis of the inner cylinder. Provision is made to apply a voltage between the wire and the porous cylinder sufficient to cause a corona discharge depending on the gas and its pressure. The wire which functions as an inner electrode may be either positive or negative with respect to the cylinder which functions as an outer coaxial electrode and the volume inside the inner cylinder is isolated from the outer volume except for the fact that some gas can flow through the porous cylinder wall or openings therein. The gas to be purified is pumped through the inner cylinder along its axis introducing it at one end and taking it out at the other. The pressure inside the inner cylinder is greater than that exterior thereof so that some gas will flow through the wall of the inner cylinder into the space between it and the outer vessel.

In operation, a gas to be purified is pumped through the inner cylinder along its axis. A small portion of the gas passes through the inner cylinder wall into the space between it and the outer vessel and is pumped out and discarded. The rest of the gas, now purified, passes out of the downstream end of the cylinder for storage or use. An appropriate voltage applied between the wire and the inner cylinder causes some of the gas in the vicinity of the wire to become ionized. If the wire is made positive with respect to the inner cylinder, electrons will be removed from some of the gas molecules leaving them positively charged. The electrons are accelerated toward the wire and in the process of moving toward the wire, collide with other molecules of the gas ionizing them and thereby increasing the number of ions. The positively charged molecules (positive ions) move very rapidly toward the porous inner cylinder encountering neutral molecules. The encounter, in the case of an ionized molecule passing near a neutral molecule of lower ionization potential, results in an exchange of charge with the lower ionization potential molecule becoming ionized. That is, the lower ionization potential molecule loses an electron to the higher ionization potential molecule. On the other hand, if the encounter is between a neutral high ionization potential molecule and an ionized lower ionization potential molecule, there is no charge exchange. The end result of this preferential exchange of charge from molecules of one ionization potential to molecules of a lower ionization potential is that a higher percentage of the lower ionization potential molecules than of the high ionization potential molecules become ionized and are accelerated toward the cylinder wall where the ions are neutralized.

Alternately, if the wire is made negative with respect to the inner cylinder, electrons are emitted from the wire and attach themselves to molecules of any electronegative gas present. These molecules, now negatively charged, move toward the porous cylinder encountering neutral molecules. As before, there is a preferential exchange of charge between molecules of one electron attachment potential and neutral molecules of greater electron attachment potential. In this manner, a higher percentage of the greater electron attachment potential molecules (comprising the contaminant gas or gases) than of the lower electron attachment potential molecules (comprising the gas to be purified) become ionized and move toward the porous cylinder where the negative ions are neutralized.

The combination of charge exchange and ion migration results in an increase in concentration of the low ionization or high electron attachment molecules near the inner surface of the inner cylinder. When the ionized molecules reach the wall of the inner cylinder, they are neutralized at the wall. Because of the pressure difference provided across the cylinder wall, the gas adjacent to its inner surface, rich in molecules of the contaminant gas or gases, passes through the wall and is discarded. This leaves the gas inside the cylinder richer in high ionization or low electron attachment potential molecules. Generally, the gas to be purified is the high ionization potential gas and the impurity to be removed is a gas having an ionization potential less than that of the gas to be purified.

It is an object of the present invention to provide an efficient and economic apparatus for the concentration and removal of contaminants in a gas flow system.

It is another object of the present invention to provide apparatus for the concentration and removal of contaminants in a gas flow system where one gas, generally the contaminant, has a lower ionization or higher electron attachment potential than that of the gas flow.

It is another object of the present invention to provide apparatus for the concentration and removal of contaminants in a gas flow system wherein axial electrodes provide a corona discharge in gas flow effective to cause contaminants, one gas or gases, generally to travel to the outer electrode for removal therethrough together with a small portion of the gas flow.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
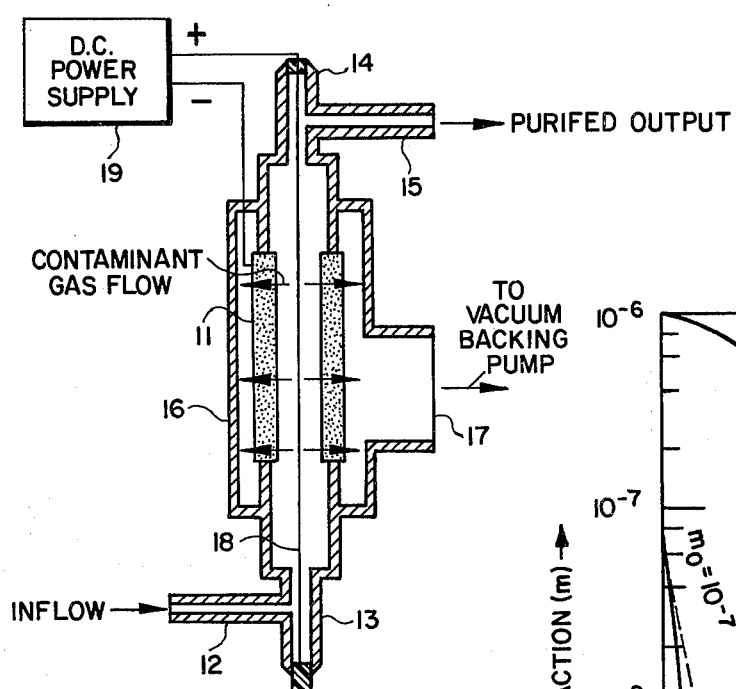
FIG. 1 is a cross-sectional side view of one embodiment of the present invention.

With reference now to FIG. 1, the parent gas or gas to be purified is introduced into a porous or perforated electrically conductive inner cylinder 11 through a pipe 12 and end cap 13. The parent gas flows through the inner cylinder 11 and exits therefrom through a second end cap 14 and pipe 15 as a purified output.

The inner cylinder 11 is sealably disposed in an outer impervious and electrically nonconductive cylinder 16 having an outlet 17 adapted to be coupled to a suitable low pressure pump (not shown) such as, for example, a vacuum backing pump. It is the function of the pump to facilitate the carrying away and removal from the outer cylinder 16 of that portion of the parent gas and contaminant that passes through the wall of the inner cylinder 11.

A wire electrode 18 such as, for example, a tantalum wire is disposed along the longitudinal axis of the inner cylinder 11, its ends being supported and retained by the end caps 13 and 14. The wire 18 is electrically insulated from the inner cylinder 11, whereby when the wire 18 and inner cylinder 11 are connected to a suitable power supply 19 as shown in FIG. 1, they will function as electrodes to produce a large area corona discharge within the inner cylinder 11. Where a porous cylinder is used as shown by way of example in FIG. 1, it most conveniently and efficiently is porous to the extent that it functions in the nature of a filter. The porosity may be in the range of ten microns. Such suitable cylinders may be obtained from the AMF Cuno Division, Meriden, Connecticut.

The wire 18 which functions as an inner electrode may be either positive or negative with respect to the inner cylinder 11 which functions as an outer coaxial electrode. The porosity of the inner cylinder and the pressure across the wall of the inner cylinder is such that a small portion of the gas, such as, for example, about 10 percent will flow through the wall of the inner cylinder into the space between it and the outer vessel or cylinder 16.

Thus, as a gas to be purified is pumped through the inner cylinder along its axis, a small portion of the gas passes through the inner wall into the space between it and the outer vessel and is pumped out and discarded. The rest of the gas, now purified, passes out of the downstream end of the cylinder for storage or use. An appropriate voltage depending on the gas and its pressure is applied between the wire and the inner cylinder to cause some of the gas in the vicinity of the wire to become ionized. If the wire or inner electrode 18 is made positive with respect to the inner cylinder 11, electrons will be removed from some of the gas molecules leaving them positively charged. The electrons are accelerated toward the wire and in the process of moving toward the wire, collide with other molecules of the gas ionizing them and thereby increasing the number of ions. The positively charged molecules (positive ions) move very rapidly toward the porous inner cylinder and away from the wire and in the process, encounter neutral molecules. The encounter, in the case of an ionized molecule passing near a neutral molecule of lower ionization potential results in an exchange of charge with the lower ionization potential molecule becoming ionized. On the other hand, if the encounter is between a neutral high ionization potential molecule and an ionized lower ionization potential molecule, there is no charge exchange. The end result of this preferential exchange of charge from molecules of one ionization potential to molecules of a lower ionization potential is that a higher percentage of the low ionization potential molecules (contaminant) than of the high ionization potential molecules become ionized and are accelerated toward cylinder 11.

Alternately, if the wire is made negative with respect to the inner cylinder, electrons are emitted from the wire and attach themselves to molecules of gas exhibiting electron affinity. These molecules, now negatively charged, move toward the inner cylinder.

This results in an increase in concentration of the molecules exhibiting electron affinity (contaminant) near the inner surface of the inner cylinder. When the ionized molecules reach the wall of the inner cylinder, they are neutralized by electrons from the wall. Because of the pressure difference provided across the cylinder wall, the gas adjacent its inner surface, rich in high electron affinity molecules of the contaminant gas or gases, passes through the wall and is discarded. This leaves the gas inside the cylinder richer in molecules with lower electron affinity. The gas to be purified is the lower electron affinity gas and the impurity to be removed is the gas exhibiting higher electron affinity unless, of course, one wishes to utilize and therefore concentrate the other gas.

Consider now by way of example and to facilitate understanding of the present invention the discharge purification of silane permitting asymmetric reactions between charged and neutral molecules whose mutual energy is near thermal (typically 300° K.).

This type of charge exchange frequently involves exchanging an atom between the ion and molecule and has a much higher cross-section than processes exchanging only charge.

The capture-orbit cross section gives a good estimate of the rates. If an ion approaches a molecule, the latter becomes polarized to a degree approximately proportional to the coulomb field strength. The effective force between molecule and ion now varies as $(1/r^2)\cdot(\alpha/r^3) = (\alpha/r^5)$ where r is internuclear distance and $\alpha$ is the polarizability, related to the dielectric constant K and the number density N by $\alpha = (K-1)/4\pi N$. Force laws of this type do not exhibit stable orbits for approach closer than distance b*; the ion is attracted to the molecule and approaches it, spiralling inward until a repulsive-force region is reached, whereupon it spirals outward. The residence time near the molecule is thus very long, and the probability of charge transfer approaches unity provided that the molecular ionization potential is lower than that of the ion. The minimum impact parameter $b_c$ leading to an orbit grazing the sphere r−b* then provides a charge-exchange cross-section $\sigma = \pi b_c^2$. The charge exchange reaction rate can then be shown to be:

$$k = <\sigma v> = \left[\frac{\pi e^2 \alpha}{\epsilon_0 M_r}\right]^{\frac{1}{2}} (MKS)$$

where $\epsilon_o$ is the permittivity of space and $M_r$ is the reduced mass.

Numerical values of k predicted for certain molecules are given in Table I. (T=300° K.) with reduced molecular weight in the last column.

TABLE I

| Molecule | T °C. | $\alpha$ cm$^3$ | k cm$^3$/sec | $n_o M_r$ |
|---|---|---|---|---|
| H$_2$O | 100 | 5.1 × 10$^{-23}$ | 5.0 × 10$^{-9}$ | 11 |
| CO$_2$ | 100 | 4.0 × 10$^{-24}$ | 1.53 × 10$^{-9}$ | 9.43 |
| H$_2$ | 100 | 1.07 × 10$^{-24}$ | 1.83 × 10$^{-9}$ | 1.78 |
| NH$_3$ | 0 | 2.1 × 10$^{-23}$ | 3.3 × 10$^{-9}$ | 10.6 |
| AsH$_3$ | −100 | 2.7 × 10$^{-24}$ | 8.5 × 10$^{-10}$ | 20.6 |
| PH$_3$ | 0 | 1.1 × 10$^{-23}$ | 2 × 10$^{-9}$ | 15.4 |

Comparison of measured rates with predicted rates in Table I shows that while the predicted rate for H$_2$O is high, typical of the anomalous properties of that molecule, the rates predicted for charge transfer to CO$_2$ and H$_2$ are within 30% of the measured rates.

In view of the above, half the predicted rate for charge transfer to phosphine, $k=10^{-9}$, will be used in subsequent estimates.

Figure 3:
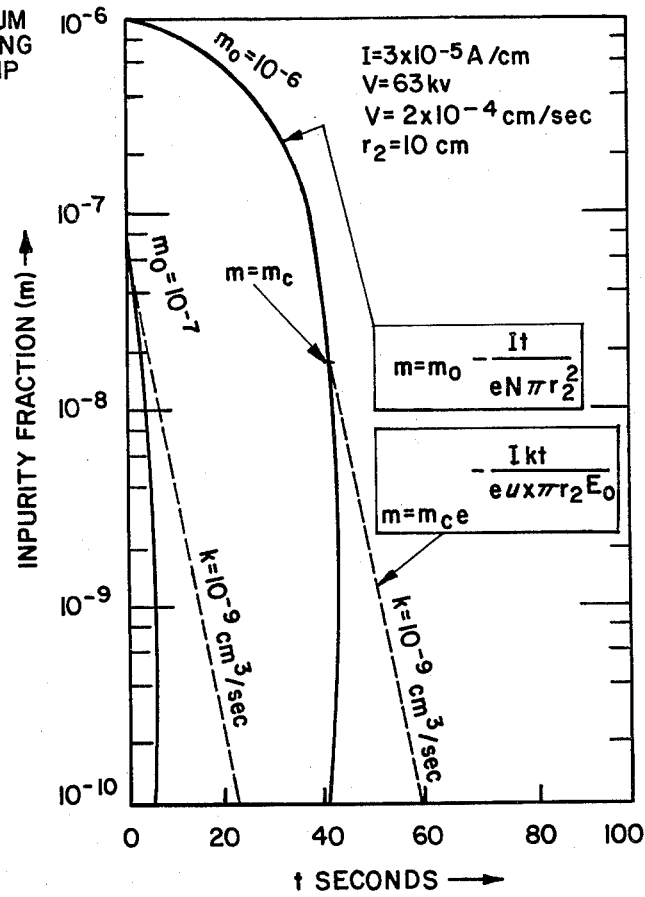
FIG. 3 is a graphic representation showing impurity removal history and energy input per $cm^3$ in silane in accordance with the invention.

The ratio of impurity in the treated gas is given as a function of $I_t$, the total amount of charge passed through the gas per centimeter of wire in FIG. 3, using typical corona discharge values and taking $k=10^{-9}$ cm$^3$/sec. The gas can therefore be cleaned with the passage of only small total amounts of charge.

Fortunately, the ionization potentials of the impurities that are specially damaging to electronic grade silane are all lower than those of silane itself. Thus, in accordance with the present invention, all compounds having an ionization potential less than that of silane can be effectively removed.

Where the energy input into the gas from the corona discharge is sufficiently high, the parent gas may be cooled in any convenient way to keep the parent gas temperature in inner cylinder 11 from becoming excessively high. Further, swirling or vortex motion of the parent gas in inner cylinder 11 is permissible as long as the residence time in cylinder 11 is sufficient to achieve the desired percent of removal of the contaminant gas or gases and excessive back diffusion of the neutralized impurity ions into the discharge does not occur.

Figure 2:
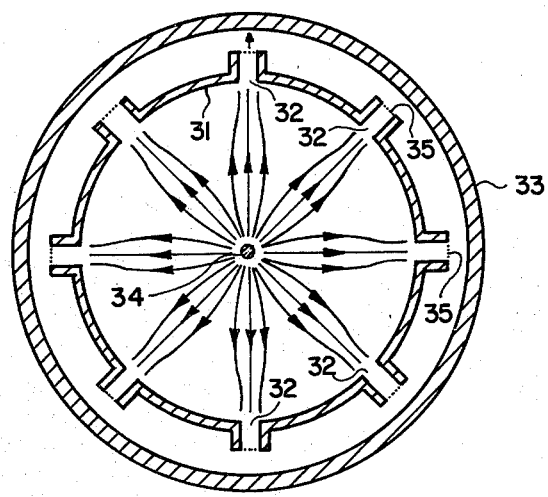
FIG. 2 is a cross-sectional end view of a modified form of the discharge chamber.

An alternate embodiment is shown in FIG. 2 wherein an inner non-conducting cylinder 31 is provided with a series of circumferentially disposed ports 32. Thus, there may be provided a number of small ports 32 circumferentially around the inner cylinder 31 (eight are shown in FIG. 2) and repeated along the axial length of the cylinder. An inner wire electrode 34 is disposed along the axis of the inner cylinder 31 and grids 35 are provided in each port. The inner cylinder 31 is disposed in an outer vessel 33 as and for the purposes discussed in connection with FIG. 1. A suitable power source (not shown) is connected between the inner electrode 34 and the grids 35 to produce a corona discharge within the cylinder 31 and the parent gas flowing therethrough. A small portion of the parent gas, together with the impurity, is removed via the ports 32. Electric lines of force are represented by the curved lines with arrowheads originating at electrode 34 and terminating in ports 32. This embodiment may also use a conducting inner cylinder 31, in which case the electric lines of force will be radial and the grids 35 must be electrically insulated from cylinder 31.

It can be shown that, for example, an appropriate number of outlets is one thousand for an inner cylinder having a radius of 10 cm and a length of 120 cm, an inner electrode radius of 0.14 cm, a current flow of 30 μA/cm, an electric field near $E_o=4.5$ KV/cm, a voltage drop of $\Delta V=65$ KV, a 10 percent loss of parent gas, a throughput of 0.8 gram/sec, and port radius of 1 mm and length of 1 cm.

While processing of silane with contaminants has been discussed by way of example, it will be apparent that the present invention will operate over a wide range of main constituent gases with a wide variety of contaminants, the essential characteristic of separation being that the ionization potential of the contaminants is less than or their electron attachment potential is greater than that of the constituent gas.

The efficiency of apparatus in accordance with the invention contrary to that of prior art devices, is not effectively limited by the effects of space charge formed by the contaminants near the wall of the inner cylinder, since they are neutralized when they contact the wall, may contact it over its entire inner surface and may easily and quickly pass through the wall of the inner cylinder. Further, the ionized molecules will travel toward the inner cylinder at about the speed of sound, thereby permitting a rapid flow of main constituent gas through the inner cylinder.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. The method of selectively removing a first contaminant gas having a first ionization potential from admixture with a gaseous stream of a second gas having a second higher ionization potential and for selectively removing a first contaminant gas having a first electron attachment potential from admixture with a second gas having a second lower electron attachment potential, comprising:
   (a) passing said admixture into an inlet end of an electrically conductive pipe section having an outlet end and a plurality of small passages through its wall;
   (b) applying a DC voltage between said pipe section and a small diameter wire electrode centrally disposed in and extending at least substantially the length of said pipe section to produce an electrical field and a corona discharge therebetween, producing ionized molecules and attached electrons in said admixture;
   (c) permitting charge exchange between molecules of said admixture of gases whereby ionization is transferred to contaminant gas molecules of lower ionization potential and whereby attached electrons are transferred to contaminant gas molecules of higher electron attachment potential;
   (d) selecting polarity of said DC voltage so that said contaminant molecules are accelerated by said electric field to said wall of said pipe section where they are neutralized;
   (e) providing a reduced pressure exterior of and around said wall of said pipe section for removing from said pipe section through said small passages gas adjacent thereto in a volume forming a small percentage of said admixture and comprising said contaminant gas molecules neutralized at said wall; and
   (f) removing the remainder of said admixture through said outlet end of said pipe section as an admixture comprising essentially said second gas denuded of said first contaminant gas.

2. The method of selectively removing a first contaminant gas having a first ionization potential from admixture with a gaseous stream of a second gas having a second higher ionization potential and for selectively removing a first contaminant gas having a first electron attachment potential from admixture with a second gas having a second lower electron attachment potential, comprising:
   (a) passing said admixture into an inlet end of an electrically conductive porous pipe section having an outlet end;
   (b) applying a high DC voltage between said pipe section and a small diameter wire electrode centrally disposed in and extending at least substantially the length of said pipe section to produce an electrical field and a corona discharge between said electrode and said pipe section, producing ionized molecules and attached electrons in said admixture;
   (c) permitting charge exchange between molecules of said admixture of gases whereby ionization is transferred to contaminant gas molecules of lower ionization potential and whereby attached electrons are transferred to contaminant gas molecules of higher electron attachment potential;
   (d) selecting polarity of said DC voltage so that said contaminant molecules are accelerated by said electric field to said wall of said pipe section where they are neutralized;
   (e) providing a reduced pressure exterior of and around said wall of said pipe section for removing through the porous walls of said pipe section gas adjacent thereto in a volume forming a small percentage of said admixture and comprising said contaminant gas molecules neutralized at said wall; and
   (f) removing the remainder of said admixture through said outlet end of said pipe section as an admixture comprising essentially said second gas denuded of said first contaminant gas.

3. The method as defined in claim 2 wherein the porosity of the wall of said pipe section is selected to limit the flow of gas therethrough to a small percentage of the admixture passing through said pipe section.

4. The method of selectively removing a first contaminant gas having a first ionization potential from admixture with a gaseous stream of a second gas having a second higher ionization potential and for selectively removing a first contaminant gas having a first electron attachment potential from admixture with a second gas having a second lower electron attachment potential, comprising:
   (a) passing said admixture into an inlet end of a pipe section having an outlet end and a plurality of small outlet tubes in its wall, each said small outlet tube being provided with electrode means;
   (b) applying a DC voltage between said electrode means in said outlet tubes and a small diameter wire electrode centrally disposed in and extending at least substantially the length of said pipe section to produce an electrical field and a corona discharge therebetween, producing ionized molecules and attached electrons in said admixture;
   (c) permitting charge exchange between molecules of said admixture of gases whereby ionization is transferred to contaminant gas molecules of lower ionization potential and whereby attached electrons are transferred to contaminant gas molecules of higher electron attachment potential;
   (d) selecting polarity of said DC voltage so that said contaminant molecules are accelerated, by said electric field to said electrode means in said small outlet tubes, where they are neutralized;
   (e) providing a reduced pressure exterior of and around said pipe section for removing from said pipe section through said outlet tubes gas adjacent thereto and forming a small percentage of said admixture and comprising said contaminant gas molecules neutralized at said electrodes; and
   (f) removing the remainder of said admixture through said outlet end of said pipe section as an admixture comprising essentially said second gas denuded of said first contaminant gas.

* * * * *

UNITED STATES PATENT AND TRADEMARK OFFICE
CERTIFICATE OF CORRECTION

PATENT NO. : 4,313,739
DATED : February 2, 1982
INVENTOR(S) : Diarmaid H. Douglas-Hamilton It is certified that error appears in the above-identified patent and that said Letters Patent are hereby corrected as shown below:

Col. 2, line 67, after "attachment", insert --potential--;

and Col. 4, line 17, after "inner", insert --cylinder--.

Signed and Sealed this

Eighteenth Day of May 1982

[SEAL]

Attest:

Attesting Officer

GERALD J. MOSSINGHOFF
Commissioner of Patents and Trademarks